(12) United States Patent
Malnati (10) Patent No.: US 9,189,310 B2
(45) Date of Patent: Nov. 17, 2015

(54) AUTOMATED MONITORING OF SERVER CONTROL AUTOMATION COMPONENTS

(71) Applicant: James R. Malnati, Stillwater, MN (US)

(72) Inventor: James R. Malnati, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 131 days.

(21) Appl. No.: 13/966,591

(22) Filed: Aug. 14, 2013

(65) Prior Publication Data

US 2015/0052391 A1     Feb. 19, 2015

(51) Int. Cl.
*G06F 11/00*     (2006.01)
*G06F 11/07*     (2006.01)

(52) U.S. Cl.
CPC .................................. *G06F 11/0706* (2013.01)

(58) Field of Classification Search
USPC .............................................. 714/55, 15, 49
See application file for complete search history.

(56) References Cited

U.S. PATENT DOCUMENTS

| | | | | |
|---|---|---|---|---|
| 5,311,551 A | * | 5/1994 | Eng | 375/260 |
| 2002/0116266 A1 | * | 8/2002 | Marshall | 705/14 |
| 2006/0112280 A1 | * | 5/2006 | Cohen et al. | 713/186 |

* cited by examiner

*Primary Examiner* — Dieu-Minh Le
(74) *Attorney, Agent, or Firm* — Richard J. Gregson (57) ABSTRACT

Systems and methods for automated monitoring of automated server control components are provided. Embodiments may include transmitting a request for state information associated with a component of the automated server control system. At least one of a reception of the state information for the component and a threshold time period without reception of the state information for the component may be detected. Some embodiments may include determining if the received state information for the component comprises an error condition. In some instances, an alert may be output based on at least one of detecting the threshold time period without reception of the state information for the component and determining that the received state information comprises an error condition.

20 Claims, 8 Drawing Sheets

AUTOMATED MONITORING OF SERVER CONTROL AUTOMATION COMPONENTS

FIELD OF THE DISCLOSURE

The instant disclosure relates to computer networks. More specifically, this disclosure relates to monitoring of automated server control systems in computer networks.

BACKGROUND

Computer networks have become backbones of companies throughout the world. Even if a company does not provide products or services over the interact, computer networks within the company improve employee productivity by providing employees with instantaneous access to millions of bytes of data. In fact, many companies are unable to function when the company's computer network fails. Thus, it is imperative that companies have reliable computer networks with 99.999% up time.

Conventionally, a computer network may be provided with additional resiliency to failures by having a disaster recovery (DR) plan. That is, when a failure in the computer network occurs, a plan is available to quickly bring the computer network back to functional status, Disaster recovery plans may include actions taken by one or more actors. For example, a recovery plan may include switching to backup systems at the location of the failure. More drastic disasters may call for switching to backup systems at a location remote from the site of the failure.

To improve response to disaster events within the computer network, control over servers and partitions within a computer network may be automated. This may be referred to as Server Control Automation (SCA). SCA may be executed on one or several control systems and conventionally uses secure connections to communicate with the many separate systems associated with a DR plan. Each connection involves initial login and status inquiries to determine the current state of the separate systems and storage. Once the state is determined, however, many changes may occur that cause the DR plan to malfunction when it is needed.

For example, the connected system may have its security parameters changed. Security groups within many organizations may change system and networking parameters in order to prevent hacking, such as by evolving best practices over time. This security tightening affects the capability of control systems to perform SCA, and this failure situation may not be noticed until a DR plan takes effect.

As another example, the profile used by a control system to perform SCA by logging on to each monitored system may have been disabled, may have had its password changed, or may have been affected in other ways. Without a correctly logged on user, the control system is not able to detect failures or orchestrate DR. In addition, because the control systems may log on and poll the system for the current state, the utilities and components it relies on (such as an underlying Software Development Kit (SDK) or Secure Shell (SSH) server) may have been uninstalled, set to a disabled state, or become nonfunctional for many other reasons. Furthermore, a monitored system may hang in such a way that the "frozen" state of the system cannot be detected.

SUMMARY

The reliability and speed of a system that employs automated server controls may be improved by adding a level of monitoring to the system focused on monitoring the automated server controls. The monitoring of the automated server controls may also be automated to further improve resiliency and to quickly detect and address issues with an automated server control system.

According to one embodiment, a method may include transmitting a request for state information associated with a component of a control system and detecting at least one of a reception of the state information for the component and a threshold time period without reception of the state information for the component. The method may further include determining if the received state information for the component comprises an error condition. The method may also include outputting an alert based on at least one of detecting the threshold time period without reception of the state information for the component and determining that the received state information comprises an error condition.

According to another embodiment, a computer program product may include a non-transitory computer-readable medium comprising code to perform the steps of transmitting a request for state information associated with a component of a control system and detecting at least one of a reception of the state information for the component and a threshold time period without reception of the state information for the component. The medium may also include code to perform the step of determining if the received state information for the component comprises an error condition. The medium may further include code to perform the step of outputting an alert based on at least one of detecting the threshold time period without reception of the state information for the component and determining that the received state information comprises an error condition.

According to yet another embodiment, an apparatus may include a memory, and a processor coupled to the memory. The processor may be configured to execute the steps of transmitting a request for state information associated with a component of a control system and detecting at least one of a reception of the state information for the component and a threshold time period without reception of the state information for the component. The processor may also be configured to execute the step of determining if the received state information for the component comprises an error condition. The processor may be further configured to execute the step of outputting an alert based on at least one of detecting the threshold time period without reception of the state information for the component and determining that the received state information comprises an error condition.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
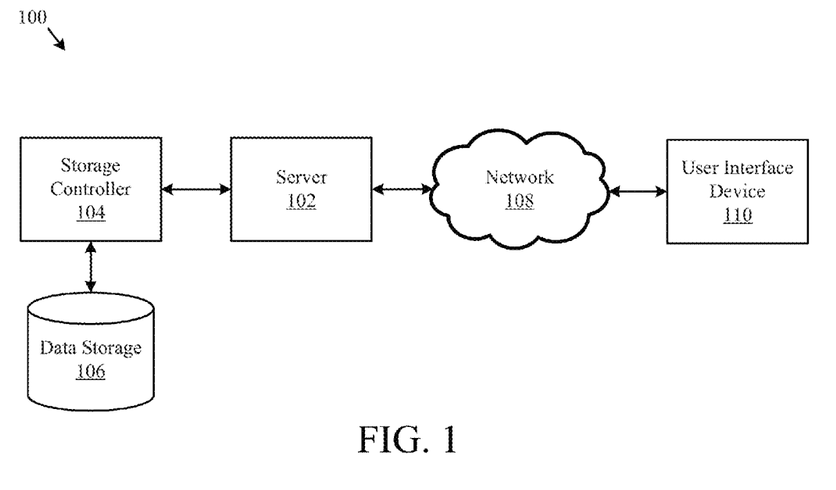
FIG. 1 is a block diagram illustrating a computer network according to one embodiment of the disclosure.

FIG. 1 illustrates one embodiment of a system 100 for automated monitoring of automated server control components. The system 100 may include a server 102, a data storage device 106, a network 108, and a user interface device 110. The server 102 may also be a hypervisor-based system executing one or more guest partitions hosting operating systems with modules having server configuration information. In a further embodiment, the system 100 may include a storage controller 104, or a storage server configured to manage data communications between the data storage device 106 and the server 102 or other components in communication with the network 108. In an alternative embodiment, the storage controller 104 may be coupled to the network 108.

In one embodiment, the user interface device 110 is referred to broadly and is intended to encompass a suitable processor-based device such as a desktop computer, a laptop computer, a personal digital assistant (FDA) or tablet computer, a smartphone or other mobile communication device having access to the network 108. When the device 110 is a mobile device, sensors (not shown), such as a camera or accelerometer, may be embedded in the device 110. When the device 110 is a desktop computer the sensors may be embedded in an attachment (not shown) to the device 110. In a further embodiment, the user interface device 110 may access the Internet or other wide area. or local area. network to access a. web application or web service hosted by the server 102 and may provide a user interface for enabling a user to enter or receive information.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 2:
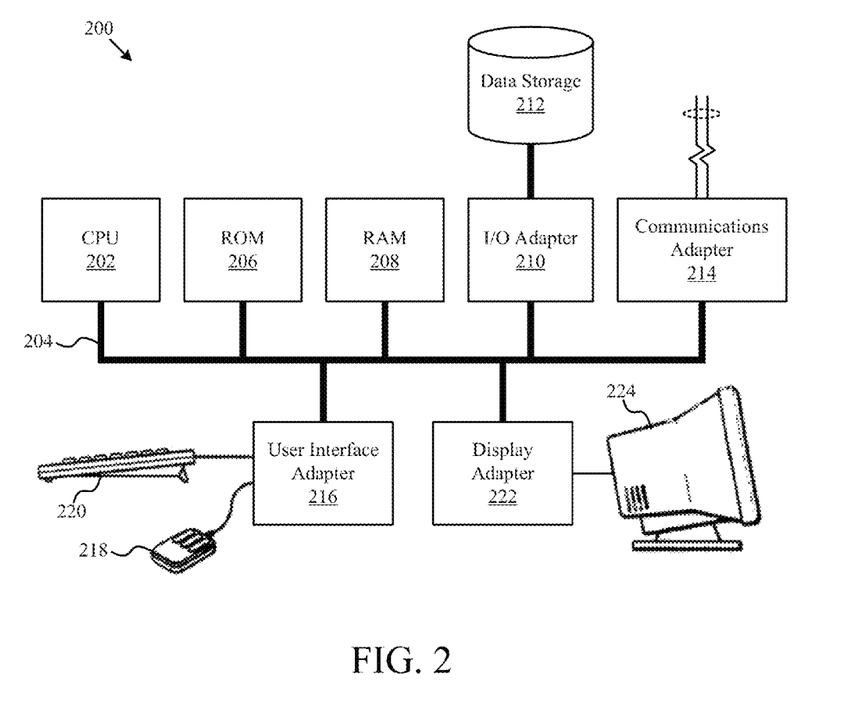
FIG. 2 is a block diagram illustrating a computer system according to one embodiment of the disclosure.

FIG. 2 illustrates a computer system 200 adapted according to certain embodiments of the server 102 and/or the user interface device 110. The central processing unit ("CPU") 202 is coupled to the system bus 204. The CPU 202 may be a general purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid state storage device, a flash drive, a compact disc (CD) drive, a floppy disk drive, and a tape drive, to the computer system 200. According to one embodiment, the data storage 212 may be a separate server coupled to the computer system 200 through a. network connection to the I/O adapter 210. The communications adapter 214 may be adapted to couple the computer system 200 to the network 108, which may be one or more of a LAN, WAN, and/or the Internet. The user interface adapter 216 couples user input devices, such as a keyboard 220, a pointing device 218, and/or a touch screen (not shown) to the computer system 200. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing, device that may be adapted to perform the functions of the server 102 and/or the user interface device 110. For example, any suitable processor-based device may be utilized including, without limitation, personal data assistants (PDAs), tablet computers, smartphones, computer game consoles, and multiprocessor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Figure 3A:
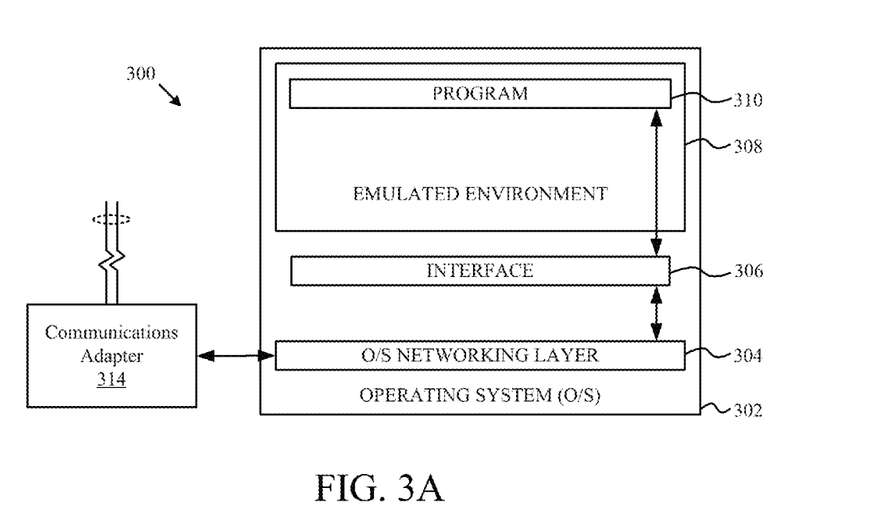
FIG. 3A is a block diagram illustrating a server hosting an emulated software environment for virtualization according to one embodiment of the disclosure.

FIG. 3A is a block diagram illustrating a server hosting an emulated software environment for virtualization according to one embodiment of the disclosure. An operating system 302 executing on a server includes drivers for accessing hardware components, such as a networking layer 304 for accessing the communications adapter 314. The operating system 302 may be, for example, Linux or Windows. An emulated environment 308 in the operating system 302 executes a program 310, such as Communications Platform (CPComm) or Communications Platform for Open Systems (CPCommOS). The program 310 accesses the networking layer 304 of the operating system 302 through a non-emulated interface 306, such as extended network input output processor (XNIOP). The non-emulated interface 306 translates requests from the program 310 executing in the emulated environment 308 for the networking layer 304 of the operating system 302.

Figure 3B:
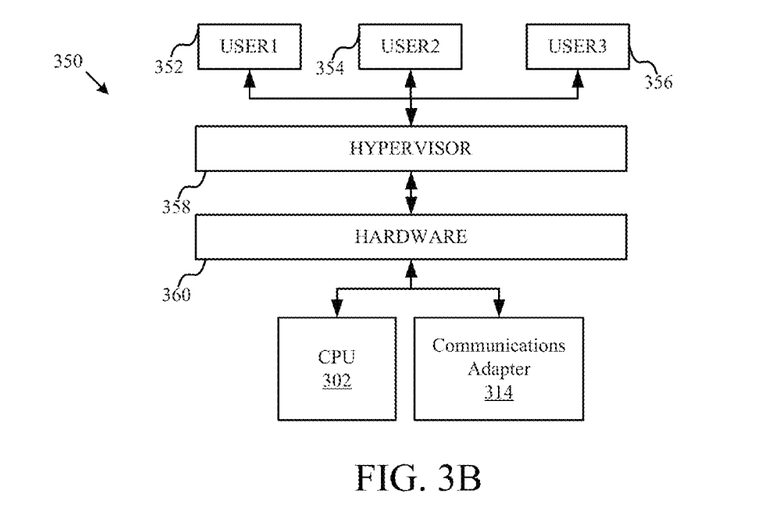
FIG. 3B is a block diagram illustrating a server hosting an emulated hardware environment according to one embodiment of the disclosure.

In another example, hardware in a computer system may be virtualized through a hypervisor. FIG. 3B is a block diagram illustrating a server hosting an emulated hardware environment according to one embodiment of the disclosure. Users 352, 354, 356 may access the hardware 360 through a hypervisor 358. The hypervisor 358 may be integrated with the hardware 360 to provide virtualization of the hardware 360 without an operating system, such as in the configuration illustrated in FIG. 3A. The hypervisor 358 may provide access to the hardware 360, including the CPU 202 and the communications adaptor 214.

Figure 4:
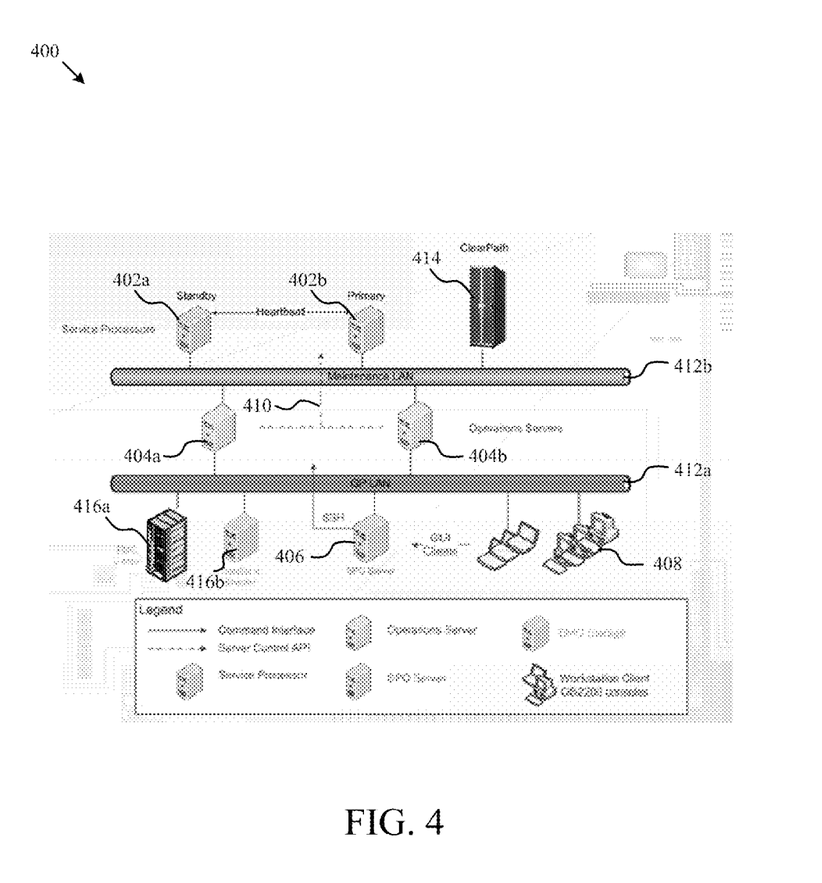
FIG. 4 is a block diagram illustrating a system with SCA according to one embodiment of the disclosure.

FIG. 4 illustrates one embodiment of a system 400 for automated monitoring of automated server control components. In some embodiments, system 400 may be an operational environment network, such as a network for general payments processing. System 400, as shown in FIG. 4, includes service processors 402a-402b that may monitor the network and components of the network for state changes, faults, and other events. The service processors 402a-402b may also be used to manage configuration, control, and maintenance functions of the hardware within system 400. According to an embodiment, service processor 402b may be a primary service processor and service processor 402a may be a standby service processor. According to some embodiments, the primary service processor 402b may actively control and monitor the hardware of system 400, and the standby service processor 402a may be available to take over control and monitoring of the hardware of system 400 if the primary service processor 402b fails.

The service processors 402a-402b may support a set of interrelated client/server software applications that provide extended system control capabilities, such as defining operating partitions, and configuration capabilities, such as auto-discovery, adding or removing hardware, and modifying the hardware state. Software for SCA may run as a service on a service processor 402.

The embodiment of system 400 also includes operations servers 404a-404b, Operations servers 404a-404b may be servers on which a server for a client/server application service may run. As an example, a client/server application service may be Operations Sentinel developed by Unisys Corporation. In some embodiments, there may be at least one client/server application server for each installation of the client/server application. According to an embodiment, there may be multiple installations of the client/server application to provide additional resiliency for the system 400. There may be multiple operations servers, in addition to operations servers 404a-404b, available in system 400. One or more of the operations servers 404a and 404b may also be used as a client/server application workstation.

System 400, as shown in FIG. 4, may also include a single point operations (SPO) server 406 functional to execute client/server applications. When executing the client/server applications, the SPO server 406 may provide a user with access to a client device the capability to monitor and control the operating systems and components of multiple host systems, automate responses to system messages, and control the operations of several systems simultaneously from a central workstation. For example, system 400 may include a plurality of clients 408, each of which a user may access to monitor and control the operating systems and components of multiple host systems, automate responses to system messages, and control the operations of several systems simultaneously. Commands input to a client 408 by a user may be processed by the SPO server 406, and communicated, via the SPO server 406, to the operations servers 404a-404b. The communication between the SPO server 406 and the operations server 404a-404b may include a secure communication, such as a Secured Shell (SSH) communication session.

The system 400 may also include a server control Applications Program Interface (API) 410. According to an embodiment, the server control API 410 may be a component of the operations servers 404a-404b that exposes an API. The API may be utilized by clients 408 to connect with server controls provided by service processors 402a-402b across the operational environment network. According to one embodiment, the server control API 410 may be used to automate operation and reconfiguration of the system 400.

In some embodiments, server control provided by service processors 402a-402b may be a set of interrelated client/server software applications executed on the SPO server 406 that provide extended system control capabilities, via the operations servers 404a-404b, to users on clients 408. Examples of the extended system control capabilities may include defining operating partitions, configuration capabilities, auto-discovery of new components, modifying the hardware state, adding or removing hardware, and the like.

In addition to components 402-410, system 400 includes a mainframe computer 414 and storage devices 416a and 416b. Each of the components 402, 404, 406, 408, 410, 414 and 416 of system 400 may communicate with each other via a communication network 412. According to the embodiment illustrated in FIG. 4, the communication network 412 may include two separate local area networks 412a and 412b. In another embodiment (not shown), all of the components 402-410 and 414-416 of system 400 may communicate with each other via a single communication network. It should be appreciated that a system, such as system 400, may include a communication network comprised of any number of separate communication networks without departing from the present disclosure in scope or spirit so long as the different components of the system are able to communicate.

The servers, client devices, user interfaces, and communication means of system 400 may include the servers, client devices, user interfaces, and communication means described above with respect to FIGS. 1-3. For example, according to one embodiment, each of the servers 402-406 may be configured similarly to the server 102 of FIG. 1, and the communication network 412 may be configured similarly to the network 108 of FIG. 1. In another embodiment, a client device 408 may be configured similarly to the computer system of FIG. 2, and the user interface may be user interface 110 of FIG. 1 or interface 306 of FIG. 3. While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details or interrelationships between embodiments, but rather are to be defined by the appended claims.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
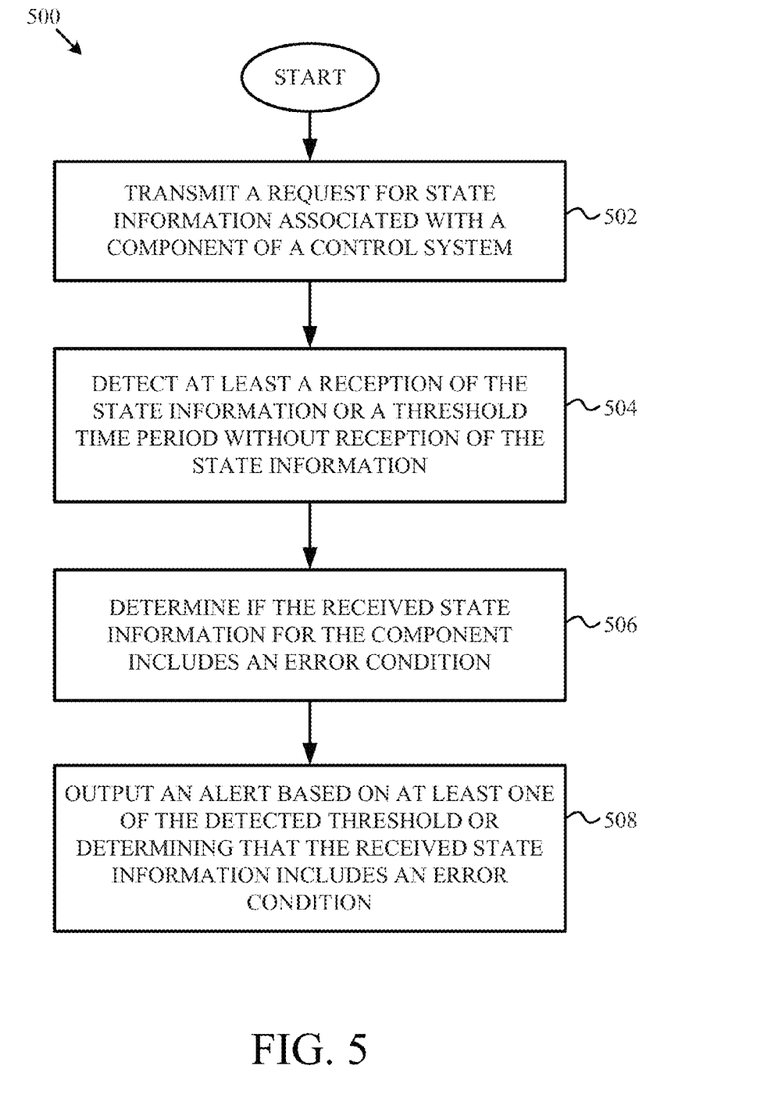
FIG. 5 is a flow chart illustrating a method for monitoring an automated server control system according to one embodiment of the disclosure.

FIG. 5 is a flow chart illustrating a method 500 for monitoring an automated server control system according to one embodiment of the disclosure. A method 500 begins at block 502 with transmitting a request for state information associated with a component of a control system. According to one embodiment, the request for state information may be automatically transmitted based on a temporal schedule. For example, an automation language controlling the process may have timeout variables and, if they expire, the process is repeated under direction of the automation language. In some embodiments, the request may be transmitted from a client device via a user interface based on input from a user. The component of the control system for which state information may be requested may include any of the components described above with respect to FIGS. 1-4. In some embodiments, the state information may include information about successful or unsuccessful system login sequences, such as whether or not the profile being used to access the system has been disabled or whether the password for the profile has changed. In other embodiments, the state information may provide information regarding the security parameters of the system, such as whether the security parameters have changed. The state information may also provide information about whether software or hardware in the system has been uninstalled, set to a disabled state, become nonfunctional, and the like. One skilled in the art will readily recognize that various components including hardware, software, a communication network, a communication session, a user interface and other components or features not listed here associated with an automated server control system may be monitored without departing from the disclosure in scope or spirit.

Referring back to FIG. 5, at block 504, the method 500 may include detecting either a reception of the state information for the component or a threshold time period expiring without reception of the state information for the component. The threshold time period may be adjustable. In some embodiments, the threshold time period may be based on user input provided at an interface of a client device.

Figure 6:
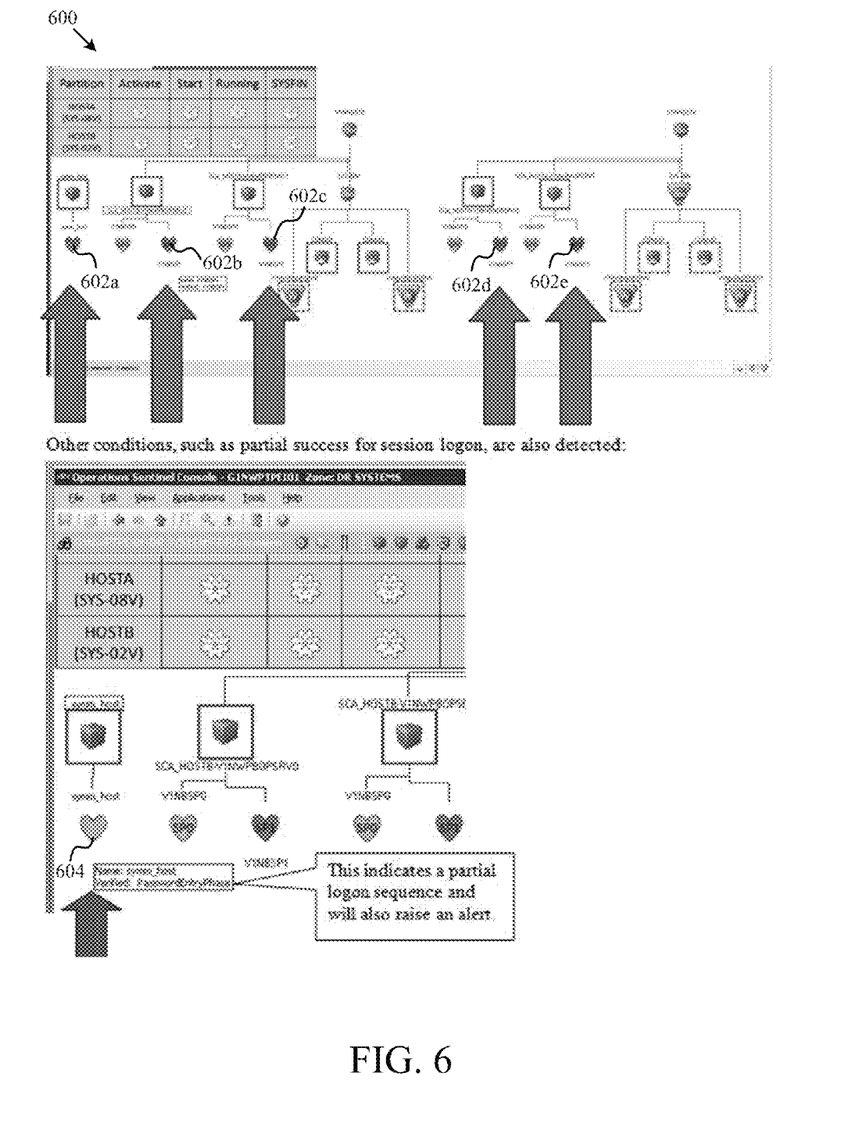
FIG. 6 is a screen shot illustrating monitoring of a server control automation system according to one embodiment of the disclosure.

As an example of received state information, FIG. 6 provides a screen shot illustrating monitoring of a server control automation system according to one embodiment of the disclosure. The screen shot 600 may provide state information for different components of the server control automation system, such as, for example, system 400, and may be displayed to a user via a user interface on a client device, such as, for example, client 408.

Figure 7:
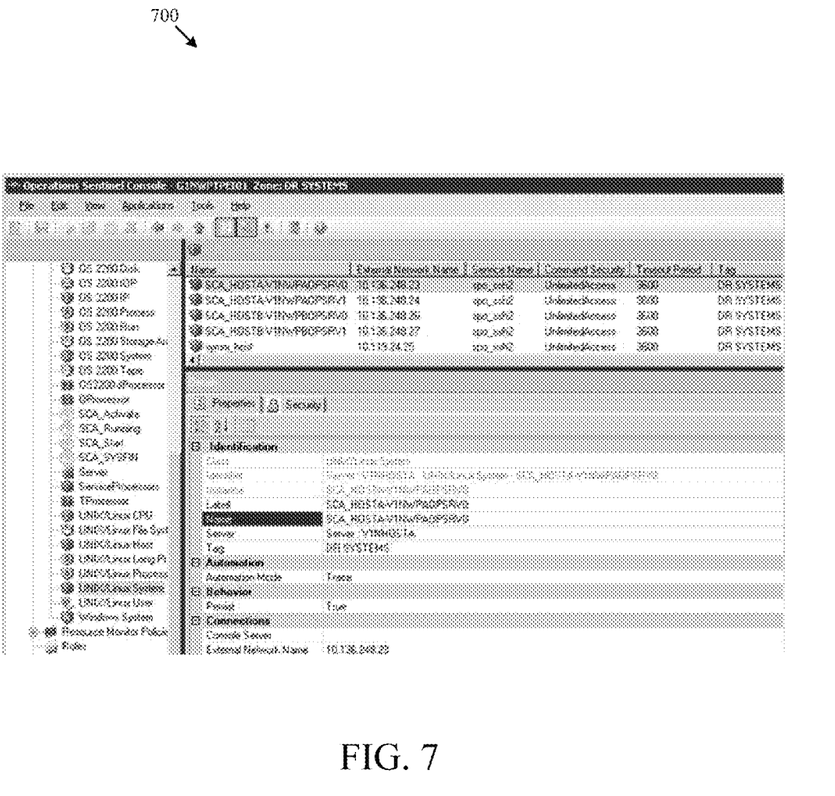
FIG. 7 is a screen shot illustrating monitoring of a connection to a server control automation system according to one embodiment of the disclosure.

As another example of monitoring received state information, FIG. 7 provides a screen shot illustrating monitoring of a. connection to a server control automation system according to one embodiment of the disclosure. In particular, the screen shot 700 illustrates the monitoring of the communication session configurations within an automated server control system. In some embodiments, the communication session may include a secure shell (SSH) session. The screen shot 700 may also be displayed to a user via a user interface on a client device, such as, for example, client 408.

Figure 8:
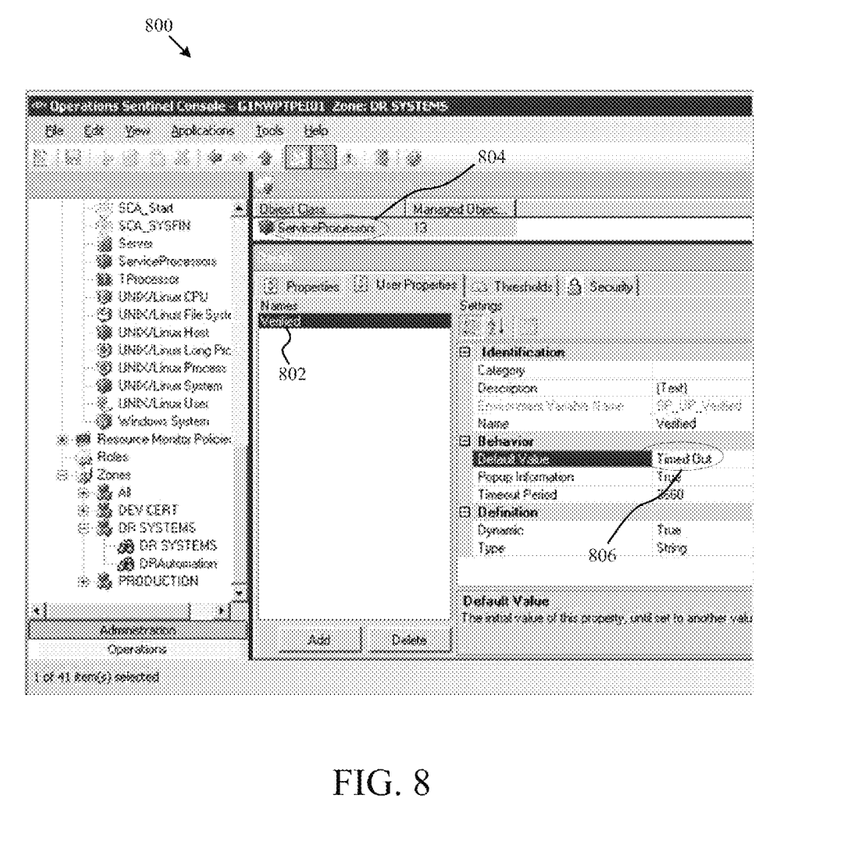
FIG. 8 is a screen shot illustrating monitoring of a system according to one embodiment of the disclosure.

As an example of detecting a threshold time period without reception of the state information for the component, FIG. 8 provides a screen shot illustrating monitoring of a system according to one embodiment of the disclosure. In particular, the screen shot 800 displays the monitoring of an object class, verified 802, for a component of a server control system. According to the embodiment of FIG. 8, if verification is not received for the component, such as for service processor 804, then a timeout time period may be determined and a timeout indication 806 may be displayed. The screen shot 800 may also be displayed to a user via a user interface on a client device, such as, for example, client 408.

Returning to FIG. 5, the method 500 further includes, at block 506, determining if the received state information for the component includes an error condition. For example, the screen shot of FIG. 6 may provide partial success login indications 602a-602e. When a failure occurs a different screen, such as the screen shot 610, may be displayed including partial login sequence alert indications 604 based on error condition being determined in the partial login sequence. At block 508, an alert may be output based on at least one of detecting the threshold time period without reception of the state information for the component and determining that the received state information comprises an error condition. For example, indications 604 of FIG. 6 may result in an alert being output at block 508. As another example, the timeout indication 806 of FIG. 8 may indicate that state information, such as the object class verified 802 for a component was not detected, which may result in an alert being output at block 508.

In some embodiments, if the received state information is determined, such as at block 506, to include an error condition, then an attempt may be made to automatically correct the error condition. An alert may then be output, such as at block 508, based on the attempt to automatically correct the error condition being unsuccessful.

According to one embodiment, outputting an alert, such as at block 508, may include outputting a visual notification of the error condition to a user interface. In some embodiments, outputting an alert may include a communication transmission to a remote device. For example, a communication transmission may include an e-mail, text message, and the like, being transmitted to a remote device, such as a mobile device, PDA, laptop, tablet, and the like. Outputting an alert, such as at block 508, may also include an audible alert. Different rules may be developed to trigger different types of alerts. For example, non-critical alerts may result in a visual alert and critical alerts may result in a communication transmission.

The method 500 of FIG. 5 may be implemented in one embodiment by detecting error conditions that may affect SCA operation by logging in to components of the SCA and automatically obtaining component state information on an hourly basis. if the state information is not available, the method may attempt to automatically correct conditions for which recovery actions have been defined. After a certain timeout period, during which no state information is received and recovery actions have not re-enabled communication of the state information, an alert may be raised to either visually notify an administrator of the failed component or generate a communication transmission.

If more than visual awareness is required, send an email, text message, or activate an audible alert to highlight the presence of a visual alert.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   transmitting, by an automated server control system, a request for state information associated with a component of a control system;
   detecting, by an automated server control system, at least one of:
      a reception of the state information for the component; and
      a threshold time period without reception c e state information for the component;
   determining, by an automated server control system, if the received state information for the component comprises an error condition; and
   outputting an alert based on at least one of:
      detecting the threshold time period expiring without reception of the state information for the component; and
      determining that the received state information comprises an error condition;
   wherein the state information comprises system login sequences.

2. The method of claim 1, further comprising:
   attempting to automatically correct the error condition if the received state information is determined to comprise an error condition; and
   outputting an alert based, at least in part, on the attempt to automatically correct the error condition being unsuccessful.

3. The method of claim 2, in which outputting an alert comprises outputting a visual notification of the error condition to a user interface.

4. The method of claim 2, in which outputting an alert comprises at least one of:
   a communication transmission to a remote device; and
   an audible alert, wherein the at least one of the communication transmission to the remote device and the audible alert is indicative of the presence of the alert.

5. The method of claim 1, in which the request for state information is automatically transmitted based on a temporal schedule.

6. The method of claim 1, in which the threshold time period is adjustable.

7. The method of claim 1, in which a component comprises at least one of hardware, software, a communication network, a communication session, and a user interface associated with the control system.

8. A computer program product, comprising:
   a non-transitory computer-readable medium comprising code to perform the steps of:
      transmitting, by an automated server control system, a request for state information associated with a component of a control system;
      detecting, an automated server control system, at least one of:
         a reception of the state information for the component; and
         a threshold time period expiring without reception of the state information for the component;
      determining, by an automated server control system, if the received state information for the component comprises an error condition; and
      outputting, by an automated server control system, an alert based on at least one of:
         detecting the threshold time period without reception of the state information for the component; and
         determining, by an automated server control system, that the received state information comprises an error condition;
   wherein the state information comprises system login sequences.

9. The computer program product of claim 8, in which the medium further comprises code to perform the steps of:

attempting to automatically correct the error condition if the received state information is determined to comprise an error condition; and outputting an alert based, at least in part, on the attempt to automatically correct the error condition being unsuccessful.

10. The computer program product of claim 9, in which outputting an alert comprises outputting a visual notification of the error condition to a user interface.

11. The computer program product of claim 9, in which outputting an alert comprises at least one of:
   a communication transmission to a remote device; and
   an audible alert, wherein the at least one of the communication transmission to the remote device and the audible alert is indicative of the presence of the alert.

12. The computer program product of claim 8, in which in which the request for state information is automatically transmitted based on a temporal schedule.

13. The computer program product of claim 8, in which the threshold time period is adjustable.

14. The computer program product of claim 8, in which a component comprises at least one of hardware, software, a communication network, a communication session, and a user interface associated with the control system.

15. An apparatus, comprising:
   a memory; and
   a processor coupled to the memory, the processor configured to execute the steps of:
      transmitting, by an automated server control system, a request for state information associated with a component of a control system;
      detecting, by an automated server control system, at least one of:
         a reception of the state information for the component; and
         a threshold time period expiring without reception of the state information for the component;
      determining, by an automated server control system, if the received state information for the component comprises an error condition; and
      outputting, by an automated server control system, an alert based on at least one of:
         detecting the threshold time period without reception of the state information for the component; and
         determining, by an automated server control system, that the received state information comprises an error condition;
   wherein the state information comprises system login sequences.

16. The apparatus of claim 15, in which the processor is further configured to perform the steps of:
   attempting to automatically correct the error condition if the received state information is determined to comprise an error condition; and
   outputting an alert based, at least in part, on the attempt to automatically correct the error condition being unsuccessful.

17. The apparatus of claim 16, in which outputting an alert comprises outputting a visual notification of the error condition to a user interface.

18. The apparatus of claim 16, in which outputting an alert comprises at least one of:
   a communication transmission to a remote device; and
   an audible alert, wherein the at least one of the communication transmission to the remote device and the audible alert is indicative of the presence of the alert.

19. The apparatus of claim 15, in which in which the request for state information is automatically transmitted based on a temporal schedule.

20. The apparatus of claim 15, in which the threshold time period is adjustable and a component of the control system comprises at least one of hardware, software, a communication network, a communication session, and a user interface associated with the control system.

* * * * *